US011188584B1

(12) United States Patent
 Allen

(10) Patent No.: US 11,188,584 B1
(45) Date of Patent: Nov. 30, 2021

(54) CUSTOMIZED SUMMARIZATION OF MEDIA CONTENT

(71) Applicant: Amazon Technologies, Inc., Seattle, WA (US)

(72) Inventor: Charles Edward Allen, Edmonds, WA (US)

(*) Notice: Subject to any disclaimer, the term of this patent is extended or adjusted under 35 U.S.C. 154(b) by 481 days.

(21) Appl. No.: 16/118,136

(22) Filed: Aug. 30, 2018

(51) Int. Cl.
 *G06F 16/34* (2019.01)
 *G06F 16/31* (2019.01)
 *G06F 16/335* (2019.01)
 *G06F 40/169* (2020.01)
 *G06N 20/00* (2019.01)

(52) U.S. Cl.
 CPC .......... *G06F 16/345* (2019.01); *G06F 16/313* (2019.01); *G06F 16/335* (2019.01); *G06F 40/169* (2020.01); *G06N 20/00* (2019.01)

(58) Field of Classification Search
 CPC .... G06F 16/345; G06F 40/169; G06F 16/335; G06F 16/313; G06N 20/00
 USPC ........................................................... 704/9
 See application file for complete search history.

*Primary Examiner* — Thierry L Pham
(74) *Attorney, Agent, or Firm* — Lee & Hayes, P.C.

(57) ABSTRACT

A media item, for example an electronic book (eBook), may be presented via an electronic device during a time period. A user of the electronic device may read a portion of the media item but end their reading session prior to finishing the entire media item. Data associated with a media item and consumption of the media item by the user may be gathered. When the media item is presented via the electronic device during a subsequent time period, a customized synopsis of the media item or a portion of the media item may be presented via the electronic device.

20 Claims, 9 Drawing Sheets

CUSTOMIZED SUMMARIZATION OF MEDIA CONTENT

BACKGROUND

A large and growing population of users enjoy entertainment through the consumption of digital media items, such as music, movies, images, books, and other types of digital content. Many people today consume digital content through a wide variety of electronic devices. Among these electronic devices are electronic book readers, cellular telephones, personal digital assistants (PDAs), portable media players, tablet computing devices, laptop computers, and the like.

Books consumed as digital content are often referred to as electronic books (or "eBooks"). Various electronic devices that are available for viewing eBooks are small, lightweight, and have reflective displays that mimic the appearance of printed paper. Although this focus has been comforting to users as they initially change from a paper-based experience to an electronic-based experience, users increasingly desire functionality that will enhance their reading experiences.

As more content is made available in digital form, the economic landscape for content creation, production, and distribution is evolving. This is particularly the case for eBooks. Such media items may be distributed online to electronic devices, without production of a portable, physical medium such as a physical paper-based book. As a result, many of the transaction costs associated with traditional channels of distribution on physical media are being reduced or eliminated entirely by improvements in technology. This leads to the possibility of new technology enabling novel models involving increasing user experience when consuming, presenting, and leveraging information to enhance presentation of digital content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
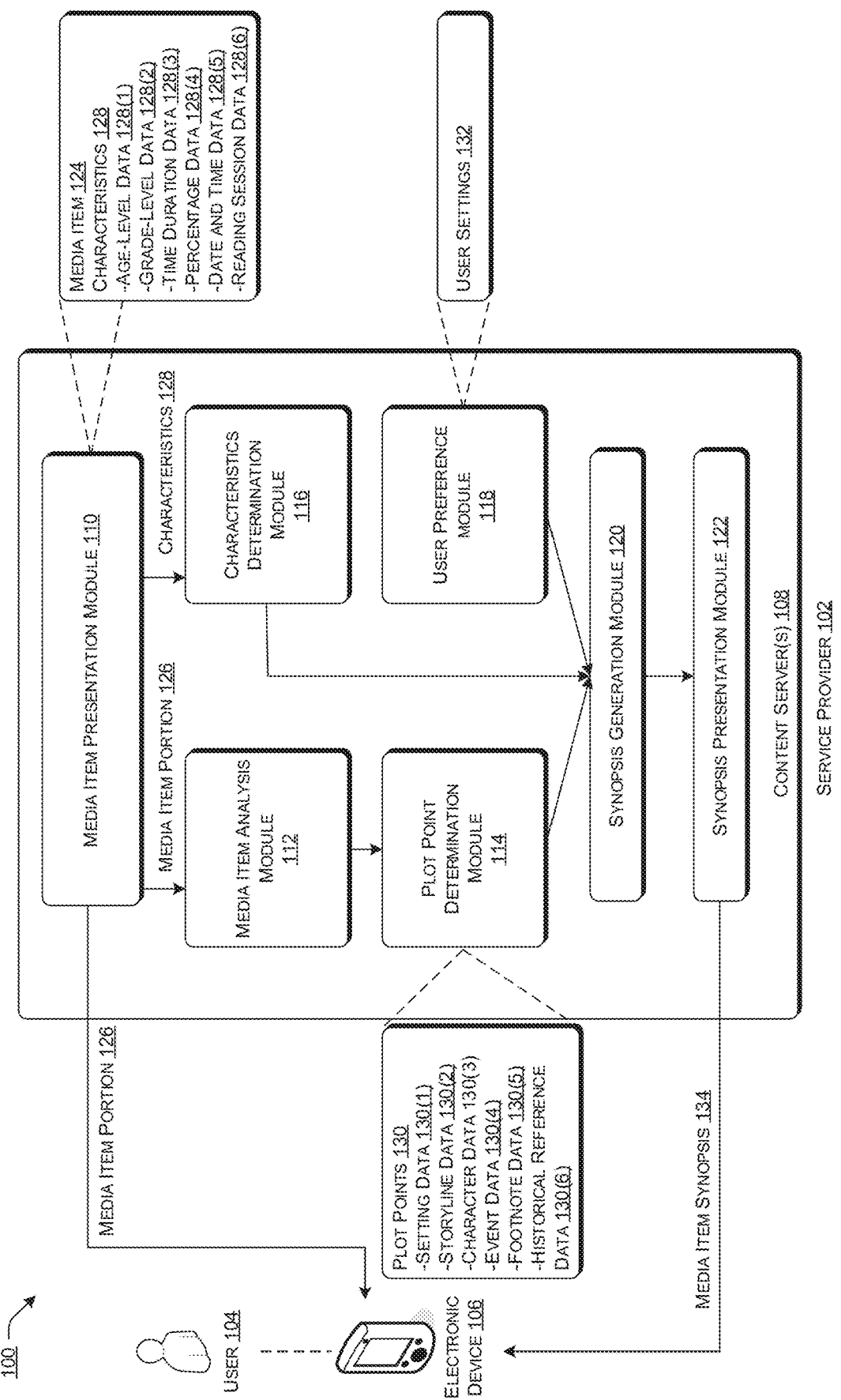
FIG. 1 illustrates an example system for generating a synopsis with respect to a media item.

In the context of physical-paper based books, as well as existing eBook related technology, there are challenges relating to recent recall comprehension after limited or sustained breaks between reading sessions. For instance, a reader may begin reading a book and stop after reading two and half chapters, or generally, after reading a portion of the book. Although the reader intended to return reading the book within the day, circumstances forced a prolonged break between reading sessions (e.g., one month).

Accordingly, the reader, after the prolonged break and wishing to pick up the book where she had previously left off, may be unable to recall characters, storylines, and/or settings in the portion of the book that she had previously read. As a refresher, the reader may spend substantial time re-reading portions of the book to try to jog her memory. This represents a waste in time and a decrease in user experience for the reader. However, even after spending a substantial time re-reading, key subject-matter in the book may still be missed. The reader, based on the prolonged period of time between reading sessions, may require a robust and/or detailed summarization of the previously read portion of the book.

This challenge is compounded in the realm of books because a generic and/or non-customized synopsis may have unintended consequences for the reader. Generic synopses, often summarizing the entire book or chapters of the book, may reveal to the reader unintended information (e.g., spoilers relating to character development and/or plot development) that may ruin the experience of the reader. Therefore, the reader may be unable to determine an accurate synopsis to recall the two and half previously read chapters. Further, the reader was particularly invested in the development of the heroine in the story, and was neither able to recall the details of the heroine's development and associated storyline nor pick up the key points while skimming the previously read portion of the book. The reader also would like to know about interesting characters, storylines, and/or settings based on readers who have read or are also reading the book. These challenges represent a technological problem because they are based on an inability to analyze, extract, determine, and display customized information based on the needs of a reader resulting in a poor user experience interacting with digital content via an electronic device. Further, these challenges represent a technological problem faced in the realm of eBook and electronic book reader technology at the time of filing.

The systems and processes described herein provide techniques for supplementing and enhancing the experience of users of an electronic device. Further, the techniques are directed to solving the technological problem of recent recall and comprehension after limited or sustained breaks consuming digital content. The techniques herein represent a solution rooted in computer-related technology to solve the above-referenced challenges. The techniques are related to the generation of a customized synopsis of digital content for display on an electronic device. In various embodiments, the generated synopsis may be based on collected, analyzed, and determined data relating to the consumption of digital content, the digital content itself, user feedback, and crowd-sourced and/or aggregated data associated with the digital content from a plurality of users. In other embodiments, the techniques may include utilizing machine learning and natural language processing. In various embodiments, these techniques improve the functionality of an electronic device, for example an electronic book reader, by providing a navigable synopsis associated with a display of an electronic book reader. Further, these techniques enable an electronic device to perform functions that the electronic device previously could not perform. Traditional methods to solve challenges with recent recall and comprehension of digital content after limited or sustained breaks in time related to re-consuming portions of digital content and/or reading generic summarizations of digital content. These methods resulted in generalized, inaccurate, and/or incomplete summarizations. In addition, the traditional methods represented a considerable burden on a computer network based on users having to re-consume, for example re-read or re-listen to digital content.

In particular, users may view and interact with digital content via an electronic device. More particularly, a user may access a site that displays or presents a plurality of media items, such as manuscripts, books, articles, and/or other types of digital content. The user may also access and consume digital content after purchasing and downloading a media item to an electronic device. A media item may be created by a service provider associated with the site, or may be received from individuals or entities (i.e., authors, editors, publishers, etc.) that authored/created the media item. Via the electronic device, the user may consume the media item. In some instances, the user may also annotate the media item.

In certain embodiments, the service provider may collect or determine various types of data about a media item and a user. This data may be indicative of a length of the media item, a format of the media item, age-level data associated with the media item, grade-level data associated with the media item, user preferences, and/or user settings. This data may also be indicative of the subject matter of the media item, including data about settings, storylines, plot points, supplemental plot points, characters, historical events and figures, languages, vocabulary, grammar, and sentence structure. This data may also be indicative of a frequency of a setting, storyline, plot point, supplemental plot point, character, and/or historical events and figures in the media item.

In certain embodiments, the service provider may collect or determine various types of data about consumption of the media item by the user. This data may be indicative of a time period the media item was presented via the electronic device, a time period a user of the electronic device consumed at least a portion of the media item, a duration of time between at least a first period of time consuming the media item and a second period of time consuming the media item (e.g., different times at which the user accessed the media item), a time of day the media item was presented via the electronic device, a proportion and/or percentage of the media item that has been presented via the electronic device overall or during a most recent time period consuming the media item, and/or annotations associated with the media item made by a user. Data may also be collected from a plurality of other users who have consumed at least a portion of the media item and/or from a plurality of other users who have annotated at least a portion of the media item. For instance, annotation data associated with the media item may be collected from the plurality of other users. This data may be aggregated with or without annotations made by the user to determine frequently annotated sections of the media item.

In certain embodiments, and upon collecting and determining the various types of data about the media item and consumption of the media item, a synopsis of the media item may be generated and presented via the electronic device. For instance, based on data collected and determined during a first reading session of an eBook, a personalized synopsis may be generated and presented via an electronic book reader to the user during a subsequent reading session. The synopsis may be presented on a display of an electronic book reader as an opaque or transparent overlay pane, an adjacent pane, a new window, and/or as a full-screen display. For instance, assume that a user read a first portion of an eBook (e.g., the first three chapters) at a first time. The user may then have accessed the eBook at a second, later time (e.g., two weeks after the first time). Since the user has not read the eBook for some time, the user may have forgotten various aspects of that portion of the eBook. For instance, the user may have forgotten details about the plot, characters that have been introduced, and so on. Accordingly, the systems and processes described herein may generate a synopsis or summary of that portion of the eBook, which will remind the user of the portions of the eBook that he/she has previously read. The synopsis will vary based on the content of the previously read portion, the amount of time between reading sessions, etc.

In certain embodiments, updates associated with the synopsis may be sent to the electronic device. For instance, if an electronic device is determined to be in an online mode based at least on determining network connectivity between the electronic device and the service provider satisfies network connectivity criteria, real-time updates associated with the synopsis may be provided to the electronic device. If an electronic device is operating in an offline mode based on determining the network connectivity between the electronic device and the service provider does not satisfy connectivity criteria, a previously cached synopsis, a previously generated synopsis, or a generalized synopsis about a portion of the media item may be presented via the electronic device. Upon determining the electronic device is operating in an online mode, updates to a synopsis and/or an updated, personalized synopsis may be provided to the electronic device.

In certain embodiments, the collection and determination of data may be a result of analyzing the media item. For instance, the media item may be analyzed using natural language processing, or similar processes, to extract data related to the subject matter of the media item.

In certain embodiments, the generation of the synopsis may be based on determining inputs using at least the collected or determined data associated with the media item and/or consumption of the media item for a machine learning model. The inputs may be used to train the machine leaning model. The machine learning model may then be utilized to determine a format and subject matter of the synopsis. The machine learning model may also be trained using other data from a plurality of other users associated with the media item.

In certain embodiments, after presenting the synopsis via the electronic device, the user of the electronic device may provide feedback indicating an accuracy or a helpfulness of the synopsis. The user may also provide comments and corrections associated with the synopsis.

For the purposes of this discussion, the media items, also referred herein as content or content items, may be manifested in many different ways including, for example, as text-based items, audio items, video items, multimedia items, graphical items, and so forth. In some embodiments, the architecture and techniques are described in the context of eBook reader devices and electronic books. The terms "electronic book" and/or "eBook," as used herein, include electronic or digital representations of printed works (or portions of printed works), as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of content items, such as music, audio books, video, and other content items that people watch, listens to, consume, or otherwise experience.

Further, eBooks are just one form of a common work. The common work may represent the text of the book regardless of the format. For example, an eBook may also be released in other forms, such as paperback, hardcover, and audio. Although a rights holder such as a publisher, author, distributor, etc. may have rights such as a copyright in the common work, multiple copies of that work may be owned by various end users. If the work is manifested in digital form (e.g., eBook), digital rights management (DRM) or other technological features may prevent lending or may limit a number of times that the digital copy of the common work may be lent. Thus, unlike paperback or hardback versions of a book, the ability to lend an eBook (or other digital item) may be a limited resource that has a high value because of the scarceness of "lends" associated with the eBook.

FIG. 1 illustrates an example system 100 for generating a synopsis with respect to a media item. The system 100, may include a service provider 102, a user 104, and an electronic device 106 associated with the user 104. In various embodiments, the service provider 102 may be any entity, server(s), platform, etc. that offers items (e.g., products, services, etc.) to a user 104 via an electronic marketplace (e.g., a website, a mobile application, etc.) associated with the service provider 102. That is, a user 104 may access the electronic marketplace via a corresponding electronic device 106 for the purpose of searching for, viewing, selecting, acquiring (e.g., purchasing, leasing, renting, borrowing, lending, etc.) items, etc. The items may be provided directly by the service provider 102 or may be provided by the service provider 102 on behalf of a different entity. That is, via a website, an electronic marketplace, and/or a mobile application associated with the service provider 102, the users 104 may order for items. The electronic device 106 may be an electronic book reader, a mobile phone, a smart phone, a personal digital assistant, a portable media player, a tablet computing device, a laptop or desktop computer, or the like.

In various embodiments, a user 104 may have a user account and/or a user profile associated with the service provider 102. In other embodiments a user 104 and/or electronic device 106 may be associated with a user profile and/or a user account. Moreover, for the purposes of this discussion, the term user 104 may also be referred to "user profile" or "user account," and vice versa. Moreover, a particular user account may be associated with multiple user profiles. For instance, a particular user account may be associated with an adult user profile, a child user profile, a teen user profile, and so on.

Some user data associated with the user 104 may be determined from the user profile of a user 104, such as personal information (e.g., address, telephone number, etc.), demographic information (e.g., age, gender, ethnicity, etc.), interests of the user 104, and so on. Other user data may be stored on content server(s) 108 in association with the user profile of the user 104. Such data may include the user's 104 activity with respect to a retail site associated with the service provider 102, such as search history, purchase history, viewing history, a saved-items list (i.e., a "wish" list), reviews submitted by the user 104, and so on.

The service provider 102, may include, or be associated with, one or more devices (e.g., content server(s) 108). Moreover, the content servers 108 may contain any number of servers that are possibly arranged as a server farm. Other server architectures may also be used to implement the content server(s) 108. In various embodiments the content server(s) may maintain one or more modules, such as a media presentation module 110, a media item analysis module 112, a plot point determination module 114, characteristics determination module 116, a user preference module 118, a synopsis generation module 120, and a synopsis presentation module 122.

In various embodiments, the media item presentation module 110 of the content server(s) 108 may present, via the electronic device 106, a media item 124 (or content, content item, etc.) which may include any type of digital or electronic content, such as eBooks, other textual files, audio files (e.g., music, audio books, etc.), video files (e.g., movies, television shows, etc.), content (e.g., text, news feeds, etc.) from social network sites or platforms, and so on. For instance, the media items 124 (e.g., eBooks, video content, etc.) may be displayed via one or more displays of the electronic device 106, or the media items 124 (e.g., music content, audio books, etc.) may be audibly output via one or more speakers of the electronic device 106. In particular, the media item 124 may include manuscripts, articles, and other works of literature that are created by one or more authors, which may include individuals or entities. The media item 124 may be provided to the service provider 102 by the authors, or the service provider 102 itself may generate, edit, publish, etc., the media items 124. The service provider 102 may provide the media item 124 and/or a media item portion 126 to the electronic device 106 for a user 104 to access. A user 104 may access the media item 124 or the media item portion 126 via a purchase, download, etc.

In addition, the media item presentation module 110 may collect or determine characteristics 128 relating to consumption of the media item 124, including the media item portion 126. For instance, the media presentation module 110 can collect and determine age-level data 128(1) or grade-level data 128(2) associated the media item 124 or media item portion 126. The age-level data 128(1) may be assigned to the media item 124 or the media item portion 126 by the service provider 102 and/or an external source and may be associated with standardized reading comprehension and subject-matter appropriateness metrics such as DRA, QRI, Lexile scores, a publisher rating, and/or the like. Grade level data 128(2) may be a metric, description, and/or rating based on comprehension difficulty and linguistic complexity of the media item 124. Grade level data 128(2) may also be based on a lexical density of the text, which may correspond to a proportion of words that give the media item portion 126 meaning (e.g., nouns, adjectives, verbs, and/or adverbs) divided by a total number of words in the media item portion 126, and/or a quantity or proportion of technical terminology (e.g., words that have specialized and/or restricted meaning within a particular field or trade). The media presentation module 110 can also collect time duration data 128(3) associated with an amount of time between a user 104 accesses of the media item 124/media item portion 126 using a single electronic device 106, or multiple electronic devices 106. For instance, the time duration data 128(3) may correspond to an amount of time (e.g., seconds, minutes, hours, days, weeks, months, etc.) between a first time at which the media item 124/media item portion 126 was accessed and a second time at which the media item 124/media item portion 126 was accessed, using the same or different electronic devices 106. The media item presentation module 110 may also collect percentage data 128(4) associated with a percentage of the media item 124 that has been presented/consumed via the electronic device 106, date and time data 128(5) associated with a date and time when the media item portion 126 was presented/accessed via the electronic device 106, and reading session data 128(6) associated with a consumption rate and/or a rate the media item portion 126 was presented via the electronic device 106.

In various embodiments, the service provider 102 may provide a media item portion 126 to the media item analysis module 112. The media item portion 126 is a portion of the media item 124 that has been accessed by the user 104, consumed by the user 104, and/or displayed to the user 104 via the electronic device 106. For instance, a media item 124 may be an electronic book (eBook) that a user 104 read via an electronic book reader. During a first reading session, the user may read two chapters of the eBook. The media item portion 126 may correspond to the two chapters of the eBook that the user has read or otherwise accessed/viewed. Accordingly, the service provider 102 may determine the media item portion 126 (e.g., the two chapters read by the user) and provide it to the media item analysis module 112.

The media analysis module 112 may extract from the media item portion 126 data associated with the subject matter of the media item portion 126. The subject matter may correspond to a setting, storyline, character, event, footnote, and/or reference in the media item portion 126. For instance, nouns, adjectives, verbs, adverbs, and/or dialogue in the media item portion 126 may be correspond to the subject matter of the media item portion.

For instance, the media item analysis module 112 may use natural language processing (NLP) or similar techniques to extract and/or identify data related to the subject matter of the media item portion 126.

In various embodiments, the extracted data from the media item analysis module 112 is used to determine plot points 130. The plot points are associated with the subject matter of the media item portion 126. For instance, the plot points 130 may include data associated with a setting 130(1), a storyline 130(2), a character 130(3), an event 130(4), a footnote 130(5), and/or a historical reference 130(6). For instance, in the context of an electronic book (eBook) containing a story, a setting 130(1) may be associated with a time period and/or location of the events in a story, a storyline 130(2) may be associated with the events of a story presented as an interrelated sequence, a character 130(3) may be associated with a person, an object, a persona, or a personification in a story, an event 130(4) may be a circumstance or inflection point impacting a setting 130(1) or a character 130(3) in a story, a footnote 130(5) may be associated with an ancillary piece of information presented on a page of the eBook, and a historical reference 130(6) may be associated with an additional setting, additional storyline, additional character, or additional event. In various embodiments, the historical reference 130(6) may be non-fictional or fictional.

In various embodiments, the service provider 102 may provide the characteristics 128 to the characteristics determination module 116. The characteristics determination module 116 may determine characteristics 128 associated with presenting the media item portion 126 to a user 104 via the electronic device 106. For instance, the characteristics determination module 116 may use the time duration data 128(3) to determine an amount of time (e.g., seconds, minutes, hours, days, weeks, months, etc.) that corresponds to a time period between a first time at which the media item 124/media item portion 126 was accessed and a second time at which the media item 124/media item portion 126 was accessed, using the same or different electronic devices 106.

The characteristics determination module 116 may determine time duration data that is qualitative (e.g., a short, medium, or long time period between presentation of the media item portion 126 and presentation of the media item 124 via the electronic device 106), quantitative (e.g., one minute, one hour, one day, etc.), and/or a combination of both.

In various embodiments, the service provider 102 may collect and/or determine user settings 132 and provide the user settings 132 to the user preference module 118 via the service provider 102. The user-preference module 118 may determine if the user settings 132 are associated with generation of a media item synopsis 134. For instance, user settings 132 may be associated with the media item synopsis 134 by indicating whether a user 104 would like to receive a media item synopsis 134. If a user 104 indicates they would like to receive a media item synopsis 134, the user settings 132 may indicate a length of the synopsis (e.g., short, medium, long, etc.). Each length of the synopsis can be based on predefined conditions indicating a page length and/or a word count of a synopsis using qualitative and/or quantitative criteria. A user 104 may also indicate if they would like real-time updates via the electronic device 106.

In various embodiments, the characteristics 128, the plot points 130, and/or the user settings 132 may be provided to the synopsis generation module 120. The synopsis generation module 120 may generate a media item synopsis 134 based at least on the data provided. In various embodiments the synopsis generation module 120 may generate the media item synopsis by leveraging the media item 124 and/or media item portion 126. For instance, the synopsis generation module 120 may leverage a media item portion 126 corresponding to a text passage of an electronic book (eBook). The synopsis generation module 120 may use the data provided to run the text passage through a compression system to omit and/or emphasize particular text passage portions. In other embodiments, the synopsis generation module 120 may leverage a shortening system. For instance, if a text passage is four sentences long, the shortening system may shorten the text passage to one sentence while maintaining a subject matter of the original four sentences. To accomplish this compression, the shortening system may add, delete, replace, or modify the words and/or punctuation of the sentences in the text passage. In other embodiments, the synopsis generation module 120 may leverage the media item portion and/or a shortening system individually in combination. In other embodiments, the synopsis generation module 120 may be configured as a feedback loop. For instance, a text passage may be run through a shortening system a first time. The resulting shortened text passage may be subsequently run through the shortening system additional times until a desired length of the text passage is met. The synopsis generation module 120 may leverage a snippets or stitching system. For instance, the synopsis generation module 120 may analyze a text passage containing four chapters of an eBook. The synopsis generation module 120 may select, based on the data provided, sentence(s) from each paragraph to form a synopsis. In some embodiments, the sentences selected from each paragraph may be unaltered and combined to form a synopsis. In other embodiments, the sentences from each paragraph may be altered (e.g., words and/or punctuation removed, added to, and/or modified) before combining them to form a synopsis. In other embodiments, altered and unaltered sentences may be both included in the generated synopsis. The techniques described with respect to the synopsis generation module 120 may be leveraged individually or in combination.

The synopsis generation module 120, after leveraging the various techniques, generates a media item synopsis 134. In various embodiments, a media item synopsis 134 corresponds to a summary of the subject matter of the media item portion. The subject matter includes at least a setting, storyline, character, event, footnote, and/or historical references associated with the media item portion 126. In addition, the characteristics 128 may be used to determine a format, layout, and/or length of the media item synopsis associated with the media item synopsis 134. In other embodiments, the synopsis generation module 120 may leverage the data associated with the characteristics 128. For instance, if age-level data 128(1) associated with the media item portion 126 indicates the media item portion is intended for children ages three to five-years-old, the synopsis generation module 120 may modify the words of the synopsis to be comprehended and appropriate for children ages three to five-years old.

The synopsis generation module 120 may then provide the media item synopsis 134 to the synopsis presentation module 122. The synopsis presentation module 122 may present the media item synopsis 134 via the electronic device 106 (e.g., via one or more displays, speakers, etc.). For instance, the media item synopsis 134 may be presented via the electronic device 106 at a beginning of, or during, a subsequent reading session in which the user accesses, consumes, or otherwise interacts with the media item 124 via the electronic device 106. The media item synopsis may serve as a reminder or recap of a previously read portion of an eBook.

Figure 2:
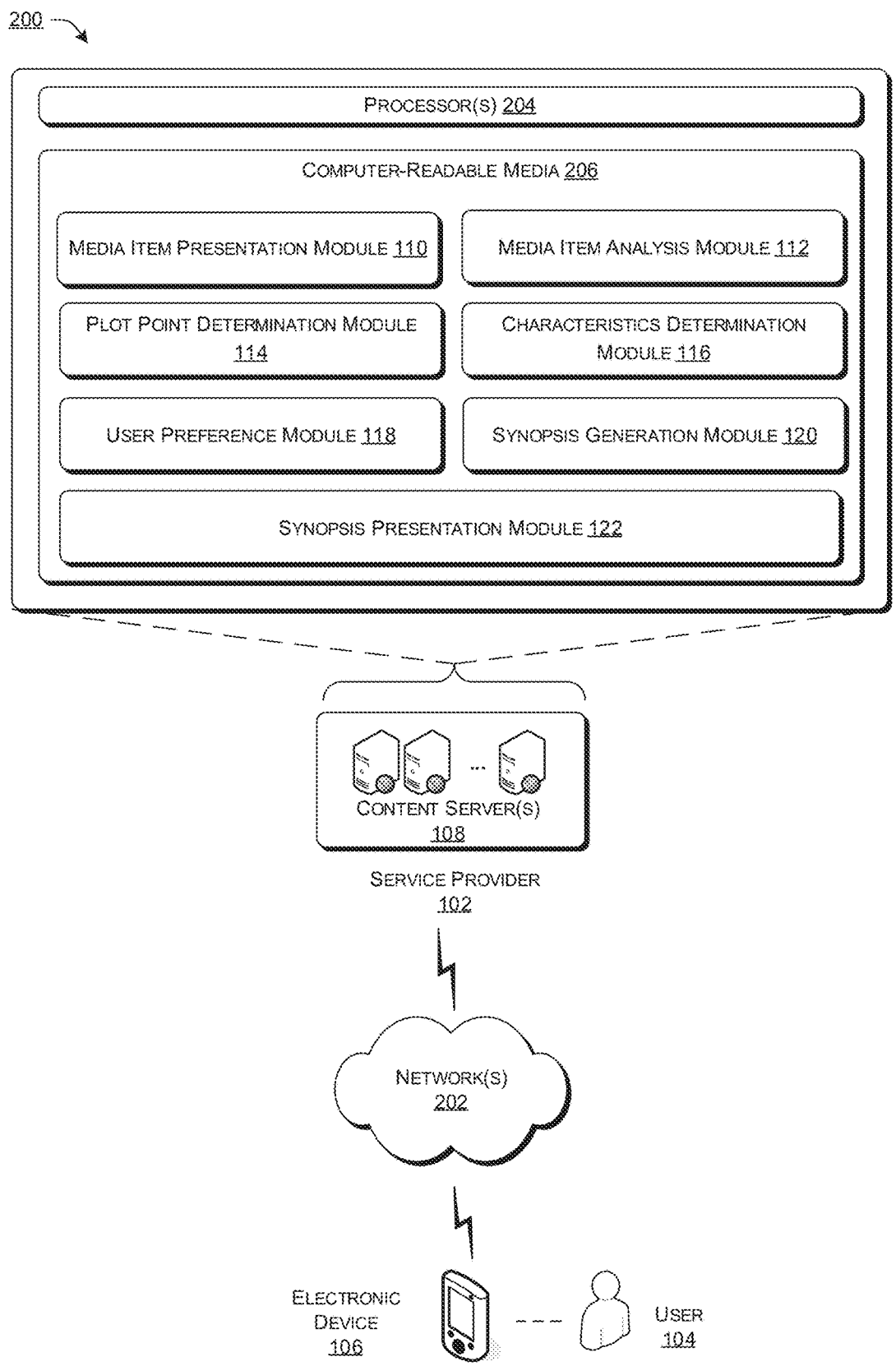
FIG. 2 illustrates an example system that includes multiple devices that facilitate the generation of a synopsis with respect to a media item.

FIG. 2 illustrates an example system 200 that includes multiple devices that facilitate the generation of a synopsis with respect to a media item. More particularly, the system 200 may include the service provider 102, a user 104, an electronic device 106 associated with the user 104, and one or more network(s) 202. As shown, the service provider 102 may include, or be associated with, the one or more content server(s) 108, which may include one or more processor(s) 204 and computer-readable media 206. The computer-readable media 206 may maintain or store the media item presentation module 110, the media item analysis module 112, the plot point determination module 114, the characteristics determination module 116, the user preference module 118, the synopsis generation module 120, the synopsis presentation module 122, and possibly other modules that perform the operations described herein.

For the purposes of this discussion, the service provider 102 may be any entity, server(s), platform, service, etc. that facilitates the synopsis generation module 120 and the generating of the media item synopsis 134. In particular, the service provider 102 may maintain a platform or site in which a user 104 may access via an electronic device 106 in order to view the media item 124 (e.g., manuscripts, articles, eBooks, literary works, periodicals, etc.) and/or one or more media item portions 126 (e.g., one or more chapters, sections, pages, etc. of the media item 124). The media item 124 may be provided to the service provider 102 by one or more authors and/or one or more publishers that create or manage the media item 124. The service provider 102 may also be associated with a retail marketplace (e.g., a website) that allows a user 104 to search for, browse, view, borrow, return, acquire, etc. items (e.g., products, services, digital items, etc.) that are maintained by the service provider 102, and that are possibly maintained on behalf of other entities (e.g., artists, authors, publishers, vendors, other service providers, merchants, etc.).

The network(s) 202 may facilitate communications and/or interactions between the content server(s) 108 of the service provider 102, and/or the electronic device 106. The network (s) 202 may facilitate such communications/interactions via any type of network, such as a public wide-area-network (WAN) (e.g., the Internet), which may utilize various different technologies including wired and wireless technologies.

In some embodiments, the service provider 102 may be equipped with communication technology in order to present a media item 124 via one or more networks 202. The network(s) 202 may be any one or combination of multiple different types of networks, such as the Internet cable networks, cellular networks, wireless networks (e.g., Wi-Fi, cellular, etc.), and wired networks. Moreover, the service provider 102 and the user 104 (via the electronic device 106) may communicatively couple to the network(s) 202 in any manner, such as by a wired or wireless connection.

In some embodiments, the user 104 may operate a corresponding electronic device 106 to perform various functions. The electronic device 106 may include one or more processor(s), computer-readable media, display(s), speaker (s), microphone(s), and so on. Furthermore, the user 104 may utilize the electronic device 106 to browse/search the site, platform, mobile application, etc. that presents the media item 124.

Moreover, and as shown, the service provider 102 may include the one or more content server(s) 108, which may include one or more processor(s) 204 and computer-readable media 206. The computer-readable media 206 may include, or be associated with, the modules described above and illustrated in FIGS. 1 and 2. The content server(s) 108 may also include additional components not listed above that may perform any function associated with the content server (s) 108. In various embodiments, each of the content server (s) 108 may be any type of server, such as a network-accessible server.

In various embodiments, the processor(s) 204 may execute one or more modules and/or processes to cause the content server(s) 108 to perform a variety of functions, as set forth above and explained in further detail in the following disclosure. In some embodiments, the processor(s) 204 may include a central processing unit (CPU), a graphics processing unit (GPU), both CPU and GPU, or other processing units or components known in the art. Additionally, each of the processor(s) 204 may possess its own local memory, which also may store program modules, program data, and/or one or more operating systems. Depending on the exact configuration and type of the content server(s) 108, the computer-readable media 206 may include volatile memory (such as RAM), non-volatile memory (such as ROM, flash memory, miniature hard drive, memory card, or the like), or some combination thereof. The computer-readable media 206 may be non-transitory computer-readable media that stores computer-executable instructions that, when executed by the one or more processors 204, causes the one or more processors 204 to perform various operations.

FIGS. 3-9 are flow diagrams of illustrative processes for generation of a media item synopsis 134. The processes are illustrated as a collection of blocks in a logical flow graph, which represent a sequence of operations that can be implemented in hardware, software, or a combination thereof. In the context of software, the blocks represent computer-executable instructions stored on one or more computer-readable media 206 that, when executed by one or more processors 204, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the processes.

Figure 3:
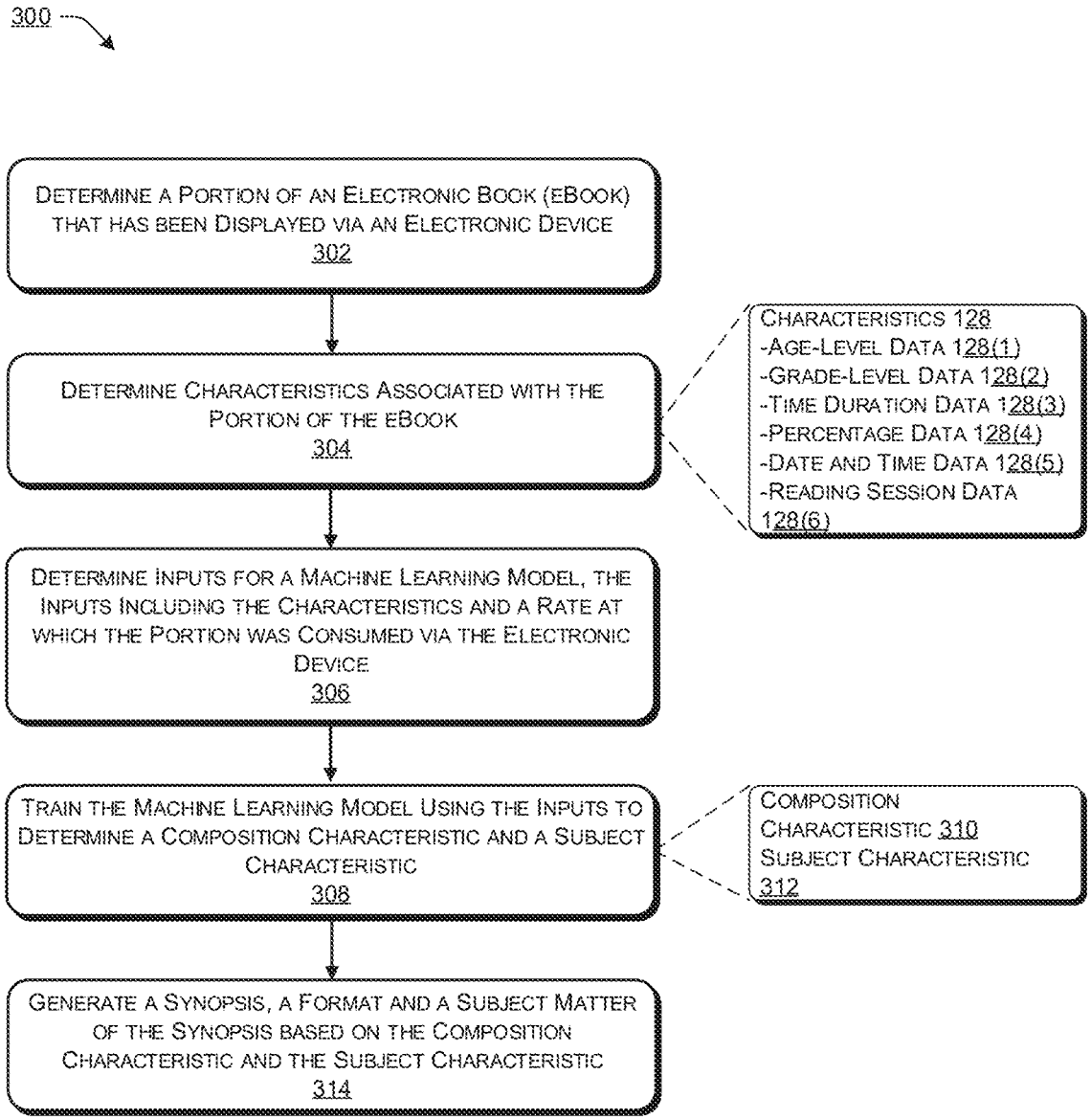
FIG. 3 is a flow diagram illustrating an example process of determining inputs and outputs of a machine learning model to generate a synopsis with respect to a media item.

FIG. 3 is a flow diagram illustrating an example process 300 of determining inputs and outputs of a machine learning model to generate a synopsis with respect to a media item. Moreover, the following actions described with respect to FIG. 3 may be performed by the service provider 102 and/or the content server(s) 108, as illustrated in, and described with respect to FIGS. 1 and 2.

Block 302 illustrates determining that a portion of an electronic book (eBook) has been displayed via an electronic device. As described above, when a media item 124 is presented via an electronic device 106 to a user 104, the user 104 may end consumption of the media item 124 (e.g., stop reading an eBook) before it the media item 124 is completed or fully consumed. Accessing or consuming the media item 124 during a period of time may be referred to herein as a "reading session." For instance, a reading session with respect to a particular media item 124 may correspond to an amount of time that begins at a first time at which the user 104 accesses the media item 124 and ends at a second time that the user 104 ceases access of the media item 124 (e.g., switches to a different media item 124, powers down the electronic device 106, places the electronic device 106 in a sleep mode, etc.). To determine the media item portion 126 has been consumed by the user 104, the service provider 102 may determine that the user 104 performed an action to cause presenting of the media item 124 via the electronic device 106 to stop before completion.

Block 304 illustrates determining characteristics associated with the portion of the eBook. In various embodiments, the user 104 may perform an action to cause presenting of the media item 124 via the electronic device 106 to stop before completion. Characteristics 128 may be collected and/or determined before, during, and/or after presenting of the media item 124 has ended.

Characteristics 128 can then be determined based on the media item 124 and/or the media item portion 126 that was consumed by the user 104. For instance, age-level data 128(1) or grade-level data 128(2) associated the media item portion 126 may be collected and/or determined. The age-level data 128(1) may be assigned to the media item 124 or the media item portion 126 by the service provider 102 and/or an external source, and the age-level data 128(1) may be associated with standardized reading comprehension and subject-matter appropriateness metrics such as DRA, QRI, Lexile scores, a publisher rating, and/or the like. Grade level data 128(2) may be a metric, description, and/or rating based on comprehension difficulty and/or linguistic complexity associated with the media item 124 or the media item portion 126. Grade level data 128(2) may also be based on a lexical density of the text, the lexical density associated with a quantity or proportion of words that carry information associated with the media item 124 and/or media item portion 126, and/or a quantity or proportion of technical terminology.

In various embodiments, characteristics 128 relating to consumption of the media item portion 126 by the user 104 may be collected and/or determined. For instance, date and time data 128(5) may be associated with a date, time, and/or time period when the media item portion 126 was presented via the electronic device 106 during a first time period. Date and time data 128(5) associated with a date, time, and/or time period when the media item 124 was presented during a subsequent time period can also be determined. Using at least the date and time data 128(5), time duration data 128(3) associated with the period of time between the first time period and a subsequent time period can be determined. In addition, percentage data 128(4) associated with a percentage of the media item 124 that has been presented via the electronic device 106 can be determined and/or collected. For example, if 25% of an eBook was presented via the electronic device 106 during a first reading session and another 25% during a second, and most recent, reading session, the percentage data 128(4) may determine that 50% of the eBook has been presented via the electronic device 106 overall, and 25% of the eBook was presented during the most recent reading session. Reading session data 128(6) may be associated with a consumption rate and/or a rate the media item portion 126 was presented via the electronic device 106. This data may be represented at least by an average or median consumption rate and/or rate the media item portion 126 was presented via the electronic device 106.

Block 306 illustrates determining inputs for a machine learning model, where the inputs include the characteristics and a rate at which the media item portion was consumed via the electronic device 106. Inputs for the machine learning model may include at least one of the characteristics 128 as discussed above. In various embodiments, the machine learning model may utilize supervised learning, unsupervised learning, semi-supervised learning, and/or reinforcement learning algorithms. For instance, the machine learning model utilize algorithms associated with at least linear regression, logistic regression, decision trees, support vector machine (SVM), naive Bayes classifiers, k-nearest neighbors, k-means clustering, random forest, dimensionality reduction, neural networks, association rules, q-learning, temporal difference (TD), deep adversarial networks, and/or gradient boosting.

Block 308 illustrates training a machine learning model using the inputs to determine a composition characteristic and a subject characteristic. Generally, machine learning involves finding and quantifying a relationship between feature values and a dependent variable, such that the relationship can be used to predict the value of the dependent variable given a set of feature values. In this case, the dependent variable(s) or the output of the machine learning model are the composition characteristic 310 and the subject characteristic 312 associated with the media item portion 126 and the feature values are the inputs that include at least one of the characteristics 128. The composition characteristic 310 is associated with modifying a structure, a format, and/or a length of the generated media item synopsis 134. The subject characteristic 312 is associated with modifying the subject matter and/or content of the generated media item synopsis 134. For example, the composition characteristic 310 may be associated with identifying an appropriate length of a media item synopsis 134 based on time-duration data 128(3). If the time duration data 128(3) indicates the length of time between two reading sessions is relatively long (e.g., one month), the determined composition characteristic 310 may indicate a longer media item synopsis 134 may be generated, possibly due to the inability of the user 104 of remembering all of the details of the media item portion 126 that he/she read. Conversely, if the time duration data 128(3) indicates the length of time between two reading sessions is relatively short (e.g., 1 hour, 1 day, etc.), the determined composition characteristic 310 may indicate a shorter media item synopsis 134 may be generated.

Block 314 illustrates generating a synopsis, a format, and a subject matter of the synopsis based on the composition characteristic 310 and the subject characteristic 312. The media item synopsis 134 is associated with a personalized synopsis of at least the media item portion 126 presented via the electronic device 106.

Figure 4:
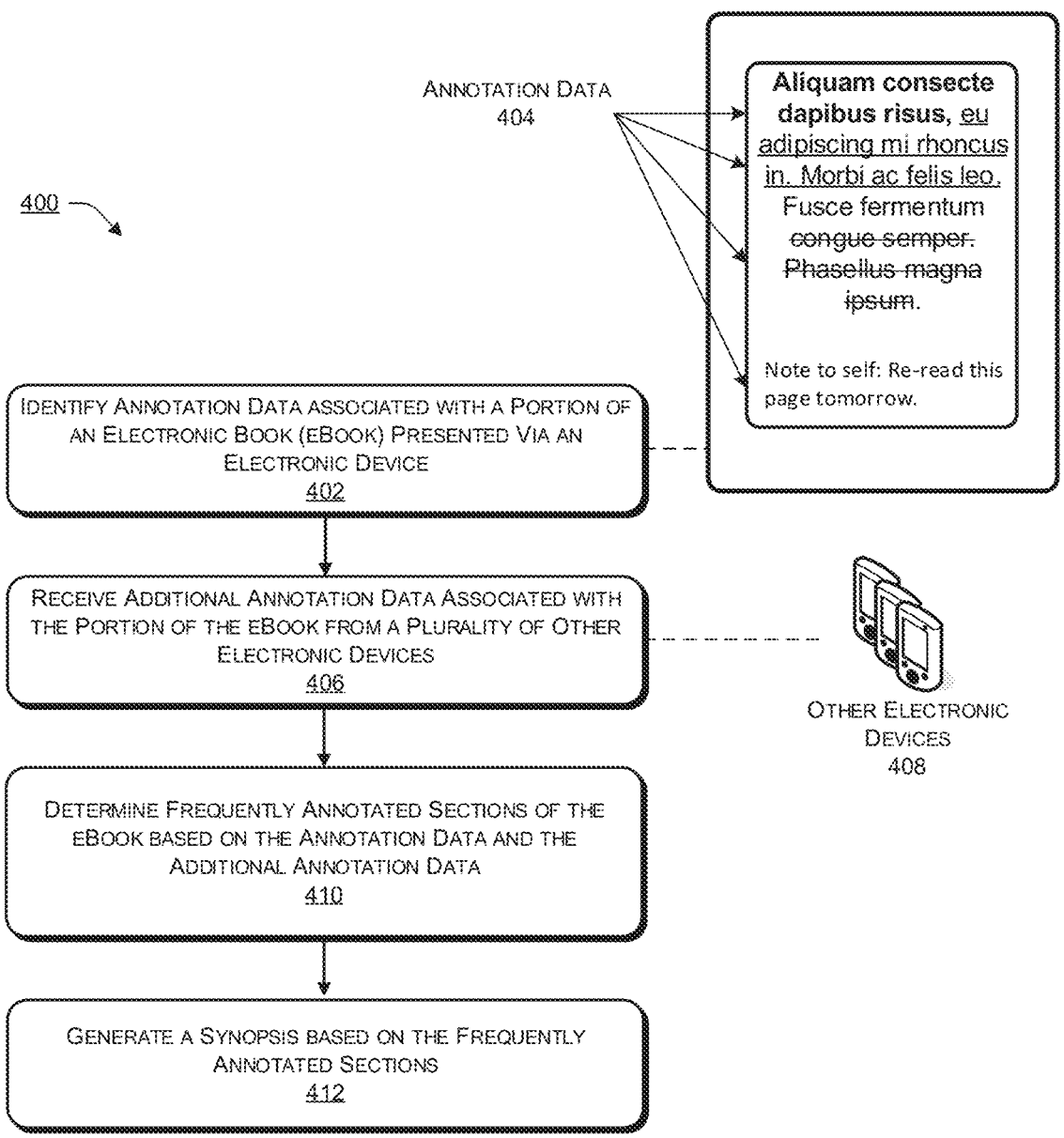
FIG. 4 is a flow diagram illustrating an example process of generating a synopsis based on annotations with respect to a media item.

FIG. 4 is a flow diagram illustrating an example process 400 of generating a synopsis based on annotations with respect to a media item. Moreover, the following actions described with respect to FIG. 4 may be performed by the service provider 102 and/or the content server(s) 108, as illustrated in, and described with respect to FIGS. 1 and 2.

Block 402 illustrates identifying annotation data associated with a portion of an electronic book (eBook) presented via an electronic device. In various embodiments, annotation data 404 associated with the media item 124 and/or media item portion 126 may be created by a user 104 associated with an electronic device 106. Annotation data 404 may include bolded text, underlined text, striked-through text, or a note as shown in FIG. 4. In other embodiments, annotation data 404 may include highlights, bookmarks, comments, footnotes, and/or italicized text.

Block 406 illustrates receiving additional annotation data associated with the portion of the eBook from a plurality of other electronic devices. In various embodiments, a plurality of other electronic devices 408 and associated users create or have created additional annotation data associated with the media item 124 or media item portion 126. The additional annotation data may include bolded text, underlined text, striked-through text, notes, highlights, bookmarks, comments, footnotes, and/or italicized text.

Block 410 illustrates determining frequently annotated sections of the eBook based on the annotation data 404 and the additional annotation data. In various embodiments, natural language processing, text analysis, and/or similar processes can be used to identify the sections of the media item 124 or media item portion 126 that contain annotation data 404 created by a user 104 associated with the electronic device 106 or additional annotation data created other users associated with the plurality of other electronic devices 408. Frequently, annotated sections of the media item 124 or the media item portion 126 can be identified. For instance, if the user 104 annotated a particular paragraph of an eBook and a majority of other users associated with the plurality of other electronic devices 408 similarly annotated the particular paragraph of an eBook, the paragraph may be determined to be a frequently annotated section. In some embodiments, if the user 104 associated with the electronic device 106 annotated the media item 124 similarly to a predetermined number and/or percentage of the other users associated with the plurality of other electronic devices 408, the similarly annotated section(s) may be determined to be frequently annotated section(s).

Block 412 illustrates generating a synopsis based on the frequently annotated sections. In various embodiments, frequently annotated sections indicate a particular passage of an eBook that is likely important or meaningful. For instance, portions of a media item 124 (e.g., an eBook) that are frequently annotated may represent important events, such as the introduction of a character or setting, a significant event that occurs in association with a character, a quotation or monologue of a key character, a change in the plot, and so on. Such events may help remind a user 104 of the portions of the eBook that he/she has previously read, and may allow the user 104 to be better prepared to read subsequent sections/portions of the eBook. Therefore, the generated media item synopsis 134 may contain subject matter related to the frequently annotated sections based on its importance to the user 104 and the plurality of other users.

Figure 5:
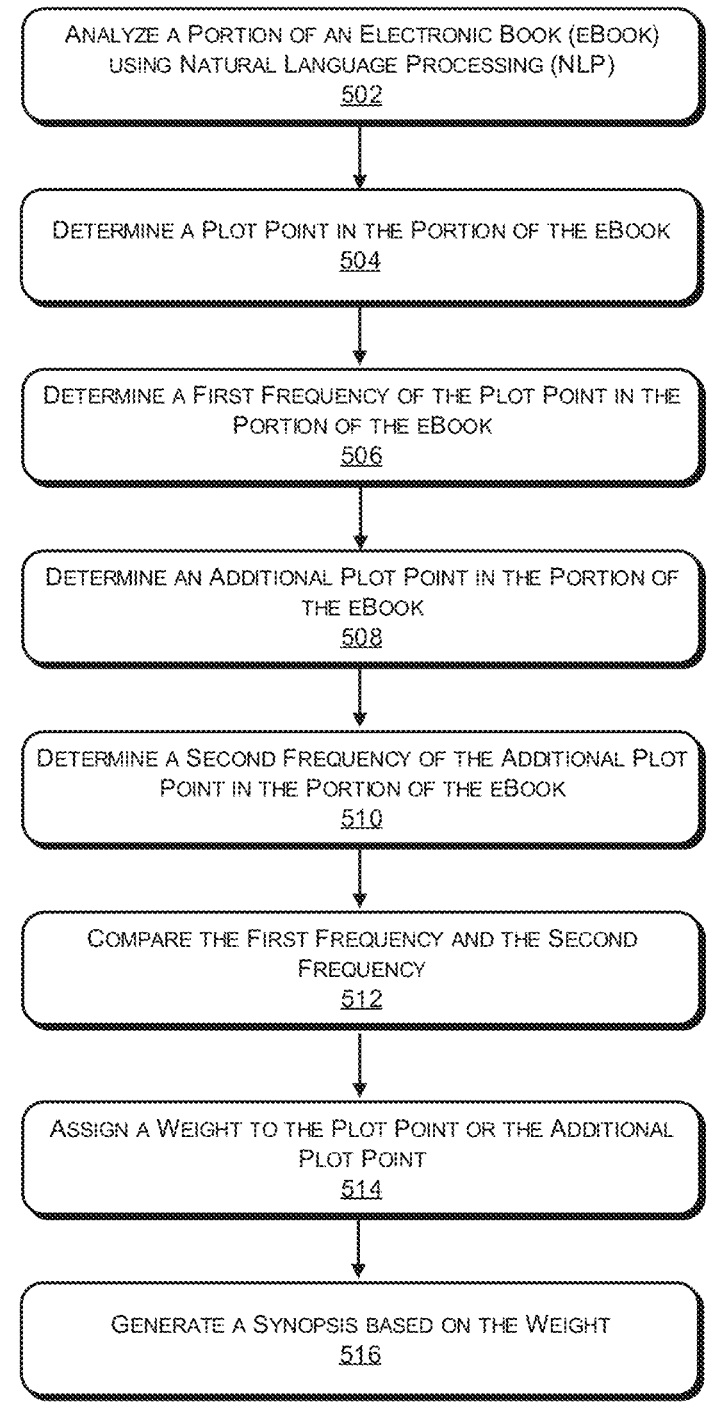
FIG. 5 is a flow diagram illustrating an example process of generating a synopsis based on frequencies of plot points associated with a media item.

FIG. 5 is a flow diagram illustrating an example process 500 of generating a synopsis based on frequencies of plot points associated with a media item. Moreover, the following actions described with respect to FIG. 5 may be performed by the service provider 102 and/or the content server(s) 108, as illustrated in, and described with respect to FIGS. 1 and 2.

Block 502 illustrates analyzing a portion of an electronic book (eBook) using natural language processing (NLP). In various embodiments, natural language processing (NLP) or similar techniques may be used to extract and/or identify plot points 130 in a media item portion 126. In various embodiments, NLP techniques associated with optical character recognition, speech recognition, sentiment analysis, semantic search, natural language programming, and affective computing. For instance, the NLP techniques may be used to identify keywords and/or a sentiment in the media item portion 126 associated with plot points 130 including setting data 130(1), storyline data 130(2), character data 130(3), event data 130(4), footnote data 130(5), and historical reference data 130(6). In various embodiments, the NLP techniques identify plot points 130 based on sentiment analysis indicating an importance of particular plot points. For example, using semantic search techniques, the media item portion 126 can be analyzed to determine if a character 130(3) is interacted with positively or negatively by other characters. Based on this analysis a plurality of characters can be analyzed based for their quantity and/or percentage of positive and/or negative interactions. In some embodiments, the plurality characters can be placed in an order based on their positive interactions. With this information, a hero (e.g., a character with the most positive interactions) and a villain (e.g., a character with the least positive interactions) may be extracted as plot points 130. As discussed above, the plot points 130 are associated with the subject matter of the media item portion 126.

Block 504 illustrates determining a plot point in the portion of the eBook. Based on the analysis at block 502, plot points 130 in the media item portion 126 can be extracted.

Block 506 illustrates determining a first frequency of the plot point in the portion of the eBook. In various embodiments, a frequency of the plot points 130 identified in the media item portion 126 may be determined. For instance, at block 502, a character 130(3) may be determined to be present in the subject matter of the media item portion 126. A first frequency of the character 130(3) may be based on analyzing the media item portion 126 for the character's name, description, dialogue, and/or language characteristics. The first frequency may be indicated by a quantitative value (e.g., 1, 2, 3 . . . n), a qualitative value ("never", "infrequently", "occasionally", and/or "frequently"), and/or a combination of both.

Block 508 illustrates determining an additional plot point in the portion of the eBook. Based on the analysis at block 502, additional plot points in the media item portion 126 can be extracted. For example, using the example above in block 502, a plot point 130 may be associated with a hero, and an additional plot point may be associated with a villain based on the analysis.

Block 510 illustrates determining a second frequency of the additional plot point in the portion of the eBook. In various embodiments, a frequency of the additional plot points may be determined in the media item portion 126. For instance, at block 502, an additional character may be determined to be present in the subject matter of the media item portion 126. A second frequency of the additional character may be based on analyzing the media item portion 126 for the additional character's name, description, dialogue, and/or language characteristics. The second frequency may be indicated by a quantitative value (e.g., 1, 2, 3 . . . n), a qualitative value ("never", "infrequently", "occasionally", and/or "frequently"), and/or a combination of both.

Block 512 illustrates comparing the first frequency and the second frequency. In various embodiments, the first frequency associated with the character 130(3) and the second frequency associated with the additional character may be compared. For instance, the first frequency may be associated with determining the character 130(3) to be in the media item portion 126 "5 times" and the second frequency may be associated with determining the additional character to be in the media item portion 126 "1 time". By comparing the first frequency and the second frequency, the first frequency associated with the character 130(3) is determined to be greater than the second frequency associated with the additional character.

Block 514 illustrates assigning a weight to the plot point or the additional plot point. Using the example above in block 512, because the first frequency associated with the character 130(3) is greater than the second frequency associated with the additional character, a weight (or a greater weight) may be assigned to the character 130(3) and/or plot points 130 associated with the character 130(3). In various embodiments, the weight may be based on predefined values or be proportional to the difference between the first frequency and the second frequency. In other embodiments, a lower weight and/or no weight may be assigned to the plot point 130 or additional plot point, whichever has the lower frequency. In some embodiments, a frequency of a plot point 130 indicates the importance of the plot point to the story 130. For instance, a plot point 130 may be associated with a first location (e.g., Mordor). In addition, an additional plot point may be associated with a second location (e.g., Rivendell). If a first frequency associated with Mordor is greater than the second frequency associated with Rivendell, Mordor may be featured more prominently in a media item portion 126. Therefore, a weight may be assigned to the plot point 130 to correspond to the greater prominence of Mordor in the media portion 126.

Block 516 illustrates generating a synopsis based on the weight. In various embodiments, the media item synopsis 134 may be based on the assigned weight. For instance, with respect to the example in Block 514, a weight assigned to the character 130(3) indicates that the character 130(3) is in the media item portion 126 more than the additional character. Therefore, the media item synopsis 134 may include more information or devote more subject matter about the character 130(3) than the additional character.

Figure 6:
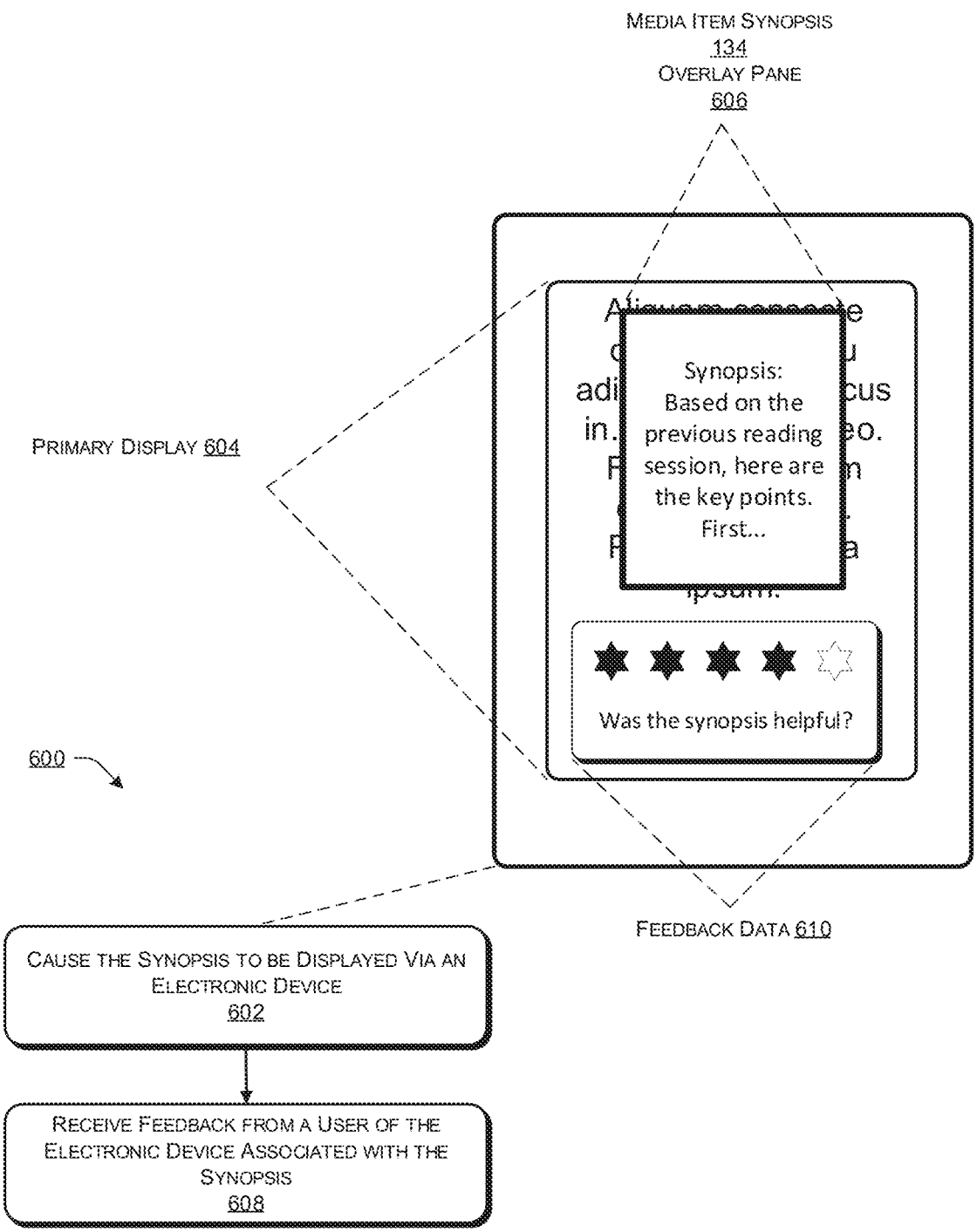
FIG. 6 is a flow diagram illustrating an example process of receiving user feedback associated with a synopsis presented via an electronic device.

FIG. 6 is a flow diagram illustrating an example process 600 of receiving user feedback associated with a synopsis presented via an electronic device. Moreover, the following actions described with respect to FIG. 6 may be performed by the service provider 102 and/or the content server(s) 108, as illustrated in, and described with respect to FIGS. 1 and 2.

Block 602 illustrates causing the synopsis to be displayed via an electronic device. In various embodiments, an electronic device 106 may be an eBook reader device as shown in FIG. 6. The eBook reader device may have a primary display 604 for displaying a media item 124. The media item synopsis 134 may be displayed concurrently with the primary display via an overlay pane 606. The overlay pane 606 may be opaque, transparent, a gradient between opaque and transparent, a color, or a combination of colors. The overlay pane 606 may be displayed over a portion or an entirety of the primary display 604. In other embodiments, the primary display 604 and the overlay pane 606 may be displayed concurrently with separate display regions formed by at least two separate delineating portions of a single display panel, or they may be formed by at least two separate and distinct display panels adjacent to each other. Further, the primary display 604 and the overlay pane 606 may be vertically adjacent, or alternatively, horizontally adjacent. In other embodiments, the primary display 604 and the overlay pane 606 may not be adjacent and simultaneously displayed via the electronic device 106. In other embodiments, the overlay pane 606 may be interleaved between portions of the primary display 604 or the overlay pane 606 may partially overlap with the primary display 604. The electronic device 106 may have various buttons, actuators, and/or controls to navigate between the primary display 604 and the overlay pane 606. In other embodiments, the primary display is associated with presenting the media item 124 and/or the media item portion 126 and the overlay pane is associated with presenting the media item synopsis 134.

Various types of display technologies may be used to implement devices such as this, including active and passive technologies, as well as color, black-and-white, and monochrome technologies. Different display regions of the same device may in some cases utilize different display technologies. For example, one display region may be a color display, while the other may be a black-and-white display. Many embodiments may use touch-sensitive display technologies for one or more of the display regions.

Block 608 illustrates receiving feedback from a user of the electronic device associated with the synopsis. In various embodiments, in response to the media item synopsis 134 being displayed, feedback data 610 from the user 104 of the electronic device 106 may be provided via the service provider 102. The feedback data 610 may be provided via the electronic device 106 or a different computing device, and may be inputted via a display, one or more buttons, a keyboard, a voice command captured by one or more microphones, or in any other manner. For instance, the feedback data 610 may be associated with an accuracy of the media item synopsis 134, a helpfulness of the media item synopsis 134, a correction to the media item synopsis 134, and/or comments on the media item synopsis 134. In various embodiments, accuracy of the media synopsis 134 may be associated with a subject matter of the synopsis. For instance, the media synopsis 134 may state that the hero in portion of the eBook was born in Seattle, Wash. However, based on reading the story, a user 104 may know that the hero lives in Seattle but was born in Spokane, Wash. Feedback data 610 associated with this inaccuracy may be provided by the user 104. In various embodiments, a helpfulness of the media synopsis 134 may be provided by the user 104. In some embodiments, the user may provide feedback in the form of providing a response to a question. For instance, a question may state if a media item synopsis 134 was helpful. In response, a user 104 may respond with predefined fields (e.g., thumbs up/down, a scale from 1-10, a rating of 1-5 stars, or the like). For example, at 610, a user 104 has responded with a four out of five star rating. In various embodiments, comments on the media item synopsis 134 may be provided by a user 104 in the form of annotating the media item synopsis 134 or writing comments in a provided field. The feedback data 610 may be used in a subsequent generation of a media item synopsis 134 for the same media item 124/media item portion 126, possibly for other users that read or otherwise consume the media item 124.

Figure 7:
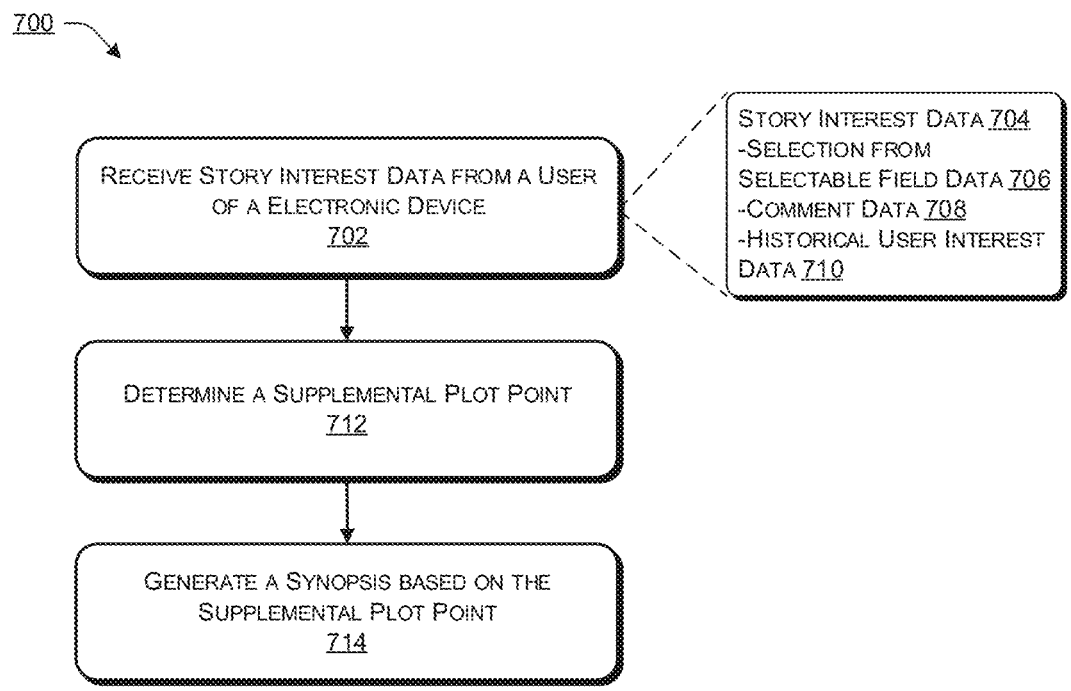
FIG. 7 is a flow diagram illustrating an example process of generating a synopsis based on a supplemental point associated with a media item.

FIG. 7 is a flow diagram illustrating an example process 700 of generating a synopsis based on a supplemental point associated with a media item. Moreover, the following actions described with respect to FIG. 7 may be performed by the service provider 102 and/or the content server(s) 108, as illustrated in, and described with respect to FIGS. 1 and 2.

Block 702 illustrates receiving story interest data from a user of an electronic device. In various embodiments, the story interest data 704 may be associated with a selection from a selectable field 706 and/or a comment 708. For instance, story interest data 704 may be associated with plot points 130 including a setting 130(1), a storyline 130(2), a character 130(3), an event 130(4), a footnote 130(5), and/or a historical reference 130(6) in the media item 124 or the media item portion 126. For instance, a user 104 associated with an electronic device 106 may select from a selectable field 706, that they are interested in the heroine of the story in the eBook. The selection in the selectable field 706 may be associated with the heroine 130(3). In other embodiments, story interest data 704 may be associated with collected and/or determined historical user interest data 710. For instance, historical user interest data 710 may be associated with other media item(s) a user 104 has purchased, consumed, downloaded, viewed, read and/or listened to.

Block 712 illustrates determining a supplemental plot point. In various embodiments, determining a supplemental plot point is in response to receiving story interest data 704 from a user 104 associated with an electronic device 106. For instance, the user 104 associated with the electronic device 106 can send story interest data 704 via the service provider 102 relating to a character 130(3) in an eBook that they are interested in following. Story interest data 704 may be associated with plurality of plot points 130 that a user 104 is interested in following. In certain embodiments, determining the supplemental plot point is based on analyzing the media item 124 or the media item portion 126. For instance, the media item 124 may be analyzed using natural language processing, or similar processes, to extract data related to the story interest data 704 in the media item 124.

In other embodiments, a weight may be assigned to the supplemental plot point. For instance, and in reference to FIG. 5, a supplemental plot point may be determined based on receiving story interest data 704 from a user 104 at 712. At 514, a weight may be assigned to the supplemental plot point before generating the synopsis at 516. In other embodiments, a frequency of the supplemental plot point may be determined before assigning a weight. In other embodiments, plot points 130 associated with a media item portion may be determined and supplemental plot points may also be determined based on story interest data 704. For instance, a weight may be assigned to the supplemental plot points based at least on their association with the story interest data 704. The plot points 130 may be assigned a lower weight and/or no weight based at least on not having an association with the story interest data 704.

Block 714 illustrates generating a synopsis based on the supplemental plot point. In various embodiments, the media item synopsis 134 may include information about a plurality of plot points 130. For instance, a synopsis may include information about various characters and plot lines. Based on the story the story interest data 704, the synopsis may be generated to more thoroughly discuss the events concerning a particular character or plot line.

Figure 8:
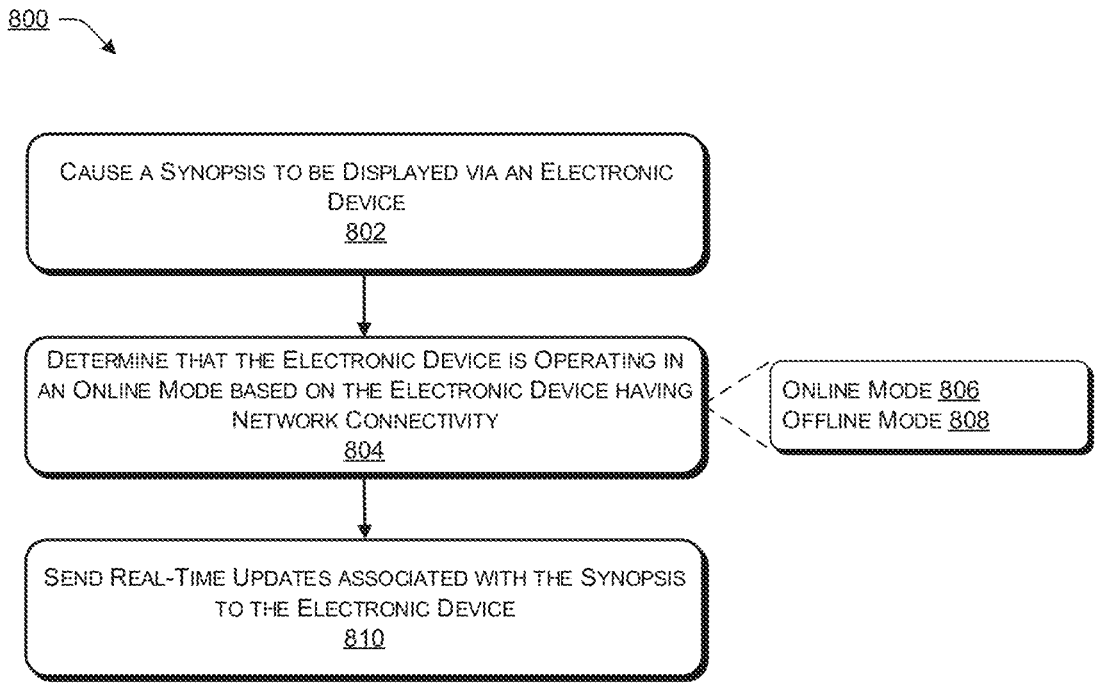
FIG. 8 is a flow diagram illustrating an example process of sending real-time updates associated with a synopsis to an electronic device.

FIG. 8 is a flow diagram illustrating an example process 800 of sending real-time updates associated with a synopsis to an electronic device. Moreover, the following actions described with respect to FIG. 8 may be performed by the service provider 102 and/or the content server(s) 108, as illustrated in, and described with respect to FIGS. 1 and 2.

Block 802 illustrates causing a synopsis to be displayed via an electronic device. In various embodiments, a media item synopsis 134 may be displayed when a user 104 associated with an electronic device 106 resumes consumption of a media item 124. For instance, the user 104 may partially read an eBook during a first reading session. During a second reading session at a subsequent time, the user 104 may be presented the media item synopsis 134 summarizing the events of the previous reading session. In other embodiments, the media item 134 synopsis may be presented via the electronic device 106 at the beginning, during, or at the end of a reading session. The media item synopsis 134 be displayed on an overlay pane 606.

Block 804 illustrates determining that the electronic device is operating in an online mode 806 based on the electronic device having network connectivity. In various embodiments, the service provider 102 is configured to detect if the electronic device 106 has network connectivity. For instance, the service provider 102 may evaluate if the electronic device 106 has network connectivity in terms of satisfying, or not satisfying, one or more connectivity criteria. For instance, the connectivity criteria may be associated with whether network connectivity is currently available between the electronic device 106 and the service provider 102, whether available network connectivity between the electronic device 106 and the service provider 102 is currently metered or unmetered, whether available network connectivity between the electronic device 106 and the service provider 102 is intermittent, a current rate of dropped data between the electronic device 106 and the service provider 102, a current speed of network connectivity between the electronic device 106 and the service provider 102, and/or a current cost of transferring data between the electronic device 106 and the service provider 102 based on the current type of network connectivity that is currently being implemented by the electronic device 106. In various embodiments, the electronic device 106 may be connected to the content server(s) 108 via a broadband connection, a cellular connection (e.g., 3G, 4G, LTE, or the like), a Bluetooth connection, a dial-up network connection, a virtual private network connection, a local area network connection, or the like. For instance, the electronic device 106 may be connected to the content server(s) 108 via WiFi.

In various embodiments, if a current status of the network connectivity between the electronic device 106 and the service provider 102 satisfies the connectivity criteria, the electronic device 106 may be determined to be operating in an online mode 806. In other embodiments, the network connectivity the electronic device 106 and the service provider 102 does not satisfy the connectivity criteria, the electronic device 106 may be determined to be operating in an offline mode 808.

Block 810 illustrates sending real-time updates associated with the synopsis to the electronic device. In various embodiments, in response to the electronic device 106 operating in an online mode 806, real-time updates may be sent via the service provider 102 to the electronic device 106 associated with the media item synopsis 134. The real-time updates may also be sent to the electronic device 106 operating in the online mode 806 intermittently during consumption of a media item 124. In other embodiments, updates associated with the media item synopsis 134 may be sent to the electronic device 106 based on predetermined time intervals and/or presentation intervals associated with the media item 124. For instance, every ten minutes spent reading an eBook or every ten pages of an eBook displayed via the electronic device 106 may trigger the sending of real-time updates associated with the media item synopsis 134 to the electronic device 106.

In other embodiments, in response to the electronic device 106 operating in an offline mode 808, updates may be sent via the service provider 102 to the electronic device 106 when the electronic 106 satisfies the connectivity criteria discussed above with respect to block 804. For instance, the updates may be sent to the electronic device 106 the next time the electronic device 106 is in the online mode 806, such as at a time that the user 104 enables WiFi connectivity and connects the electronic device 106 to a wireless network.

In other embodiments, if an electronic device 106 is operating in an offline mode, a previously cached synopsis, a previously generated synopsis, and/or a generalized synopsis about the media item portion 126 may be presented via the electronic device 106. In various embodiments, a previously cached synopsis, a previously generated synopsis, and/or a generalized synopsis may have been previously downloaded and/or accessed when the electronic device 106 was operating in an online mode 806. In other embodiments, a previously cached synopsis, a previously generated synopsis, and/or a generalized synopsis may be included with the media item 124 and/or the media item portion 126. In other embodiments, if the electronic device is operating in an offline mode 808, a pre-cached media item synopsis 134 may still be retrieved during consumption of the media item 124. For instance, a user 104 associated with an electronic device 106 may download an electronic book (eBook) which includes a synopsis for each chapter. The user 104 may travel to a location where the electronic 106 lacks network connectivity, and therefore, the electronic device 106 is operating in an offline mode 808. After determining a first chapter of the eBook has been displayed via the electronic device 106, a pre-cached synopsis for the first chapter may be presented via the electronic device 106.

Figure 9:
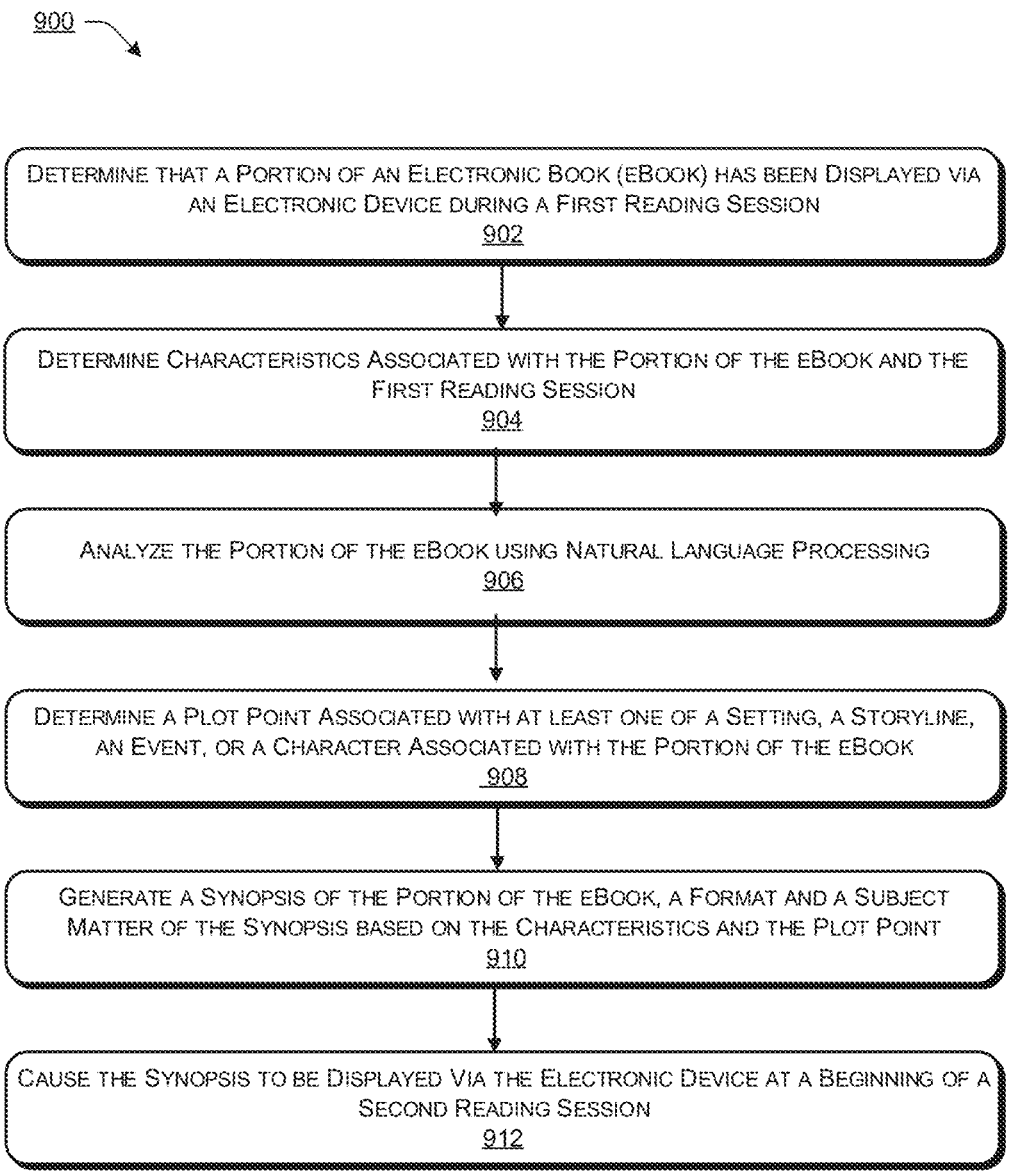
FIG. 9 is a flow diagram illustrating an example process of generating a synopsis with respect to a media item and causing the synopsis to be displayed via an electronic device.

FIG. 9 is a flow diagram illustrating an example process 900 of generating a synopsis with respect to a media item and causing the synopsis to be displayed via an electronic device. Moreover, the following actions described with respect to FIG. 9 may be performed by the service provider 102 and/or the content server(s) 108, as illustrated in, and described with respect to FIGS. 1 and 2.

Block 902 illustrates determining that a portion of an electronic book (eBook) has been displayed via an electronic device during a first reading session. In certain embodiments, an electronic device 106 may be eBook reader device. In other embodiments, the eBook may include electronic or digital representations of printed works (or portions of printed works), as well as digital content that may include text, multimedia, hypertext, and/or hypermedia.

Block 904 illustrates determining characteristics associated with the portion of the eBook and the first reading session. In various embodiments, the characteristics 128 may be associated with age-level data 128(1), grade-level data 128(2), time duration data 128(3), percentage data 128(4), data and time data 128(5), and/or reading session data 128(6).

Block 906 illustrates analyzing the portion of the eBook using natural language processing (NLP). In other embodiments, NLP or similar techniques to extract and/or identify data related to the subject matter of the portion of the eBook.

Block 908 illustrates determining a plot point associated with at least one of a setting, a storyline, an event, or a character associated the portion of the eBook. In certain embodiments, the plot points 130 are associated with the subject matter of the portion of eBook. For instance, the plot points 130 may include data associated with a setting 130(1), a storyline 130(2), a character 130(3), an event 130(4), a footnote 130(5), and/or a historical reference 130(6).

Block 910 illustrates generating a synopsis of the portion of the eBook, a format and a subject matter based on the characteristics and the plot point. In other embodiments generation of an eBook synopsis may be further based on the features shown in FIGS. 3-5 and 7.

Block 912 illustrates causing the synopsis to be displayed via the electronic device at a beginning of a second reading session. In certain embodiments, the eBook synopsis may be displayed via an overlay pane 606 associated with an electronic device 106. For instance, the user 104 may have read a first portion of the eBook during the first reading session, but may not again read the eBook for some time (e.g., days, weeks, etc.). That is, the second reading session may occur a substantial amount of time after the conclusion of the first reading session. Accordingly, it would be helpful to provide the user with a summary of the portions of the eBook that the user 104 previously consumed. As a result, at the beginning of the second reading session, the electronic device 104 may display the eBook synopsis, which will allow the user 104 to remember the previously read portions of the eBook. The eBook synopsis may also be displayed at any time during the second reading session, or even at a time prior to the second reading session, such as at a time that the user 104 otherwise utilizes the eBook reader device. For instance, the user 104 may access/read a different eBook or use the device for a different purpose (e.g., playing games, sending/receiving messages (e.g., text messages, e-mail messages, etc.), access the Internet, etc.).

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining a portion of a content item presented via an electronic device during a first time period;
   determining a duration of time between the first time period and a second time period at which the content item is accessed via the electronic device;
   determining a plot point associated with the portion of the content item, wherein determining the plot point comprises:
      extracting from the portion of the content item, via natural language processing (NLP), subject matter data associated with a subject matter of the portion of the content item, wherein the subject matter data corresponds to at least one of a setting, a storyline, an event, a character, a historical reference, or a footnote; and
      determining the plot point based at least in part on the subject matter data;
   generating a synopsis of the portion of the content item based at least in part on the duration of time and the plot point; and
   causing the synopsis to be displayed via the electronic device during the second time period.

2. The method as recited in claim 1, further comprising:
   determining inputs for a machine learning model, the inputs including at least the duration of time and the plot point; and
   training the machine learning model using the inputs, wherein generating the synopsis comprises generating the synopsis using the machine learning model.

3. The method as recited in claim 2, wherein the inputs further include at least one of a time of day at which the portion was presented during the first time period, a rate at which the portion was presented during the first time period, age-level data associated with the content item that corresponds to a reading level metric, grade-level data associated with the content item that corresponds to a reading comprehension level, or a percentage of the content item presented at least during the first time period.

4. The method as recited in claim 1, further comprising:
   identifying annotation data associated with the portion of the content item presented via the electronic device, the annotation data including at least one of a highlight, an underline, a strikethrough, a bookmark, a comment, bolded text, italicized text, a footnote, or a note;
   receiving additional annotation data associated with the portion of the content item from a plurality of other electronic devices; and
   determining frequently annotated sections of the content item from the annotation data and the additional annotation data, and wherein generating the synopsis is further based at least in part on the frequently annotated sections of the content item.

5. The method as recited in claim 1, further comprising:
   determining a first frequency of the plot point in the portion of the content item;
   determining an additional plot point in the portion of the content item;
   determining a second frequency of the additional plot point in the portion of the content item;
   comparing the first frequency and the second frequency; and
   assigning a weight to at least one of the plot point or the additional plot point based at least in part on comparing the first frequency and the second frequency, and wherein generating the synopsis is further based at least in part on the weight.

6. The method as recited in claim 1, further comprising determining user-preference settings associated with the synopsis, wherein generating the synopsis is further based at least in part on the user-preference settings.

7. The method as recited in claim 1, further comprising receiving, in response to causing the synopsis to be displayed via the electronic device, feedback data from a user of the electronic device, the feedback data including at least one of an accuracy of the synopsis, a helpfulness of the synopsis, a correction to the synopsis, or comments on the synopsis.

8. A computing device comprising:
   one or more processors; and
   memory storing computer-executable instructions that, when executed, cause the one or more processors to perform acts comprising:
      determining a portion of a content item presented via an electronic device during a first time period;
      determining a duration of time between the first time period and a second time period at which the content item is accessed via the electronic device;
      determining, via natural language processing (NLP), a plot point associated with the portion of the content item;
      generating a synopsis of the portion of the content item, based at least in part on the duration of time and the plot point; and
      causing the synopsis to be displayed via the electronic device during the second time period.

9. The computing device as recited in claim 8, wherein the acts further comprise:
   determining inputs for a machine learning model, the inputs including at least the duration of time and the plot point; and
   training the machine learning model using the inputs, wherein generating the synopsis comprises generating the synopsis using the machine learning model.

10. The computing device as recited in claim 9 wherein the inputs further include at least one of a time of day at which the portion was presented during the first time period, a rate at which the portion was presented during the first time period, age-level data associated with the content item that corresponds to a reading level metric, grade-level data associated with the content item that corresponds to a reading comprehension level, or a percentage of the content item presented at least during the first time period.

11. The computing device as recited in claim 8, wherein the acts further comprise:
identifying annotation data associated with the portion of the content item presented via the electronic device, the annotation data including at least one of a highlight, an underline, a strikethrough, a bookmark, a comment, bolded text, italicized text, a footnote, or a note;
receiving additional annotation data associated with the portion of the content item from a plurality of other electronic devices; and
determining frequently annotated sections of the content item from the annotation data and the additional annotation data, and wherein generating the synopsis is further based at least in part on the frequently annotated sections of the content item.

12. The computing device as recited in claim 8, wherein the acts further comprise:
determining a first frequency of the plot point in the portion of the content item;
determining an additional plot point in the portion of the content item;
determining a second frequency of the additional plot point in the portion of the content item;
comparing the first frequency and the second frequency; and
assigning a weight to at least one of the plot point or the additional plot point based at least in part on comparing the first frequency and the second frequency, and wherein generating the synopsis is further based at least in part on the weight.

13. The computing device as recited in claim 8, wherein the acts further comprise receiving, in response to causing the synopsis to be displayed via the electronic device, feedback data from a user of the electronic device, the feedback data including at least one of an accuracy of the synopsis, a helpfulness of the synopsis, a correction to the synopsis, or comments on the synopsis, and wherein causing the synopsis to be displayed via the electronic device includes causing an overlay pane associated with the synopsis to be displayed via the electronic device.

14. The computing device as recited in claim 8, wherein the acts further comprise determining user-preference settings associated with the synopsis, wherein generating the synopsis is further based at least in part on the user-preference settings.

15. The computing device as recited in claim 8, wherein the acts further comprise:
receiving story interest data from a user of the electronic device, the story interest data including at least one of a selection of a selectable field or a comment associated with a setting, a storyline, an event, or a character associated with the portion of the content item; and
determining a supplemental plot point associated with the portion of the content item based at least in part on the story interest data, wherein generating the synopsis is further based at least in part on the supplemental plot point.

16. A system comprising:
one or more processors; and
memory storing computer-executable instructions that, when executed, cause the one or more processors to perform acts comprising:
determining a portion of an electronic book presented via an electronic reader device during a first time period;
determining characteristics associated with the portion of the electronic book and the first time period, wherein the characteristics include a duration of time between the first time period and a second time period at which the electronic book is accessed via the electronic reader device;
determining a plot point associated with the portion of the electronic book, wherein determining the plot point comprises extracting from the portion of the electronic book, via natural language processing (NLP), data associated with at least one of a setting, a storyline, an event, a character, a historical reference, or a footnote;
generating a synopsis of the portion of the electronic book, based at least in part on the duration of time and the plot point; and
causing the synopsis to be displayed via the electronic device book at a beginning of the second time period.

17. The system as recited in claim 16, wherein a format and a subject matter of the synopsis are based at least in part on the plot point.

18. The method as recited in claim 2, further comprising training the machine learning model using the inputs to determine a composition characteristic and a subject characteristic, wherein a format and a subject matter of the synopsis are further based at least in part on the composition characteristic and the subject characteristic.

19. The method as recited in claim 1, further comprising:
determining that the electronic device is operating in an online mode based at least in part on determining that the electronic device has network connectivity; and
sending updates associated with the synopsis to the electronic device in response to determining the electronic device is operating in the online mode.

20. The method as recited in claim 19, wherein sending the updates comprises sending the updates at predetermined time intervals associated with the content item.

* * * * *